March 2, 1965

C. A. LAMBERT 3,171,912

DIRECTION SIGNAL DEVICE WITH AUXILIARY RESETTING MEANS FOR
DE-ENERGIZATION WHEN VEHICLE IS RETURNED TO
A STRAIGHT PATH

Filed Jan. 22, 1962

INVENTOR.
CECIL A. LAMBERT

BY

Robert D. Sommer

AGENT

March 2, 1965      C. A. LAMBERT      3,171,912
DIRECTION SIGNAL DEVICE WITH AUXILIARY RESETTING MEANS FOR
DE-ENERGIZATION WHEN VEHICLE IS RETURNED TO
A STRAIGHT PATH Filed Jan. 22, 1962      5 Sheets-Sheet 2

INVENTOR.
CECIL A. LAMBERT
BY
Robert D. Sommer
AGENT

March 2, 1965 C. A. LAMBERT 3,171,912
DIRECTION SIGNAL DEVICE WITH AUXILIARY RESETTING MEANS FOR
DE-ENERGIZATION WHEN VEHICLE IS RETURNED TO
A STRAIGHT PATH
Filed Jan. 22, 1962 5 Sheets-Sheet 3

INVENTOR.
CECIL A. LAMBERT
BY Robert D. Sommer
AGENT

March 2, 1965 C. A. LAMBERT 3,171,912
DIRECTION SIGNAL DEVICE WITH AUXILIARY RESETTING MEANS FOR
DE-ENERGIZATION WHEN VEHICLE IS RETURNED TO
A STRAIGHT PATH
Filed Jan. 22, 1962 5 Sheets-Sheet 4

INVENTOR.
CECIL A. LAMBERT
BY
Robert D. Sommer
AGENT

INVENTOR.
CECIL A. LAMBERT
BY Robert D. Sommer

AGENT

United States Patent Office 3,171,912
Patented Mar. 2, 1965

3,171,912
DIRECTION SIGNAL DEVICE WITH AUXILIARY RESETTING MEANS FOR DE-ENERGIZATION WHEN VEHICLE IS RETURNED TO A STRAIGHT PATH
Cecil A. Lambert, Lancaster, Ohio, assignor to Essex Wire Corporation, Fort Wayne, Ind., a corporation of Michigan
Filed Jan. 22, 1962, Ser. No. 167,834
6 Claims. (Cl. 200—61.34)

This invention relates to vehicle turn indicating signals and in particular to a turn indicating control means for energizing turn signal lamps and for automatically de-energizing the same in response to movement of the steering mechanism of a vehicle.

The usual vehicle turn signal system employs mechanical means by which a turn signal is set manually by the operator of the vehicle before making the turn and by which the signal is automatically canceled after the vehicle has completed its turn. These mechanical means include reset members operated by the steering mechanism of the vehicle to cancel an indicated turn signal when the wheels of the vehicle are returned to a straight ahead position after completion of the indicated turn. Because of mechanical considerations and to prevent premature canceling of the indicated turn signal resulting from a slight reversal of the steering mechanism during turning movement of the vehicle, the turn signal mechanical means are usually constructed to require a substantial degree of movement of the steering mechanism away from its straight ahead position before its return movement is effective to cancel the indicated turn signal. Frequently, however, the reversal of the steering mechanism after execution of a turn is too slight to effect cancellation of the turn signal. As a result, the turn signal continues to indicate a turn whereas none is contemplated creating an obvious driving hazard. Such a condition may result, for instance, from turning of the vehicle onto the obliquely curved approaches and exits of highways or from the passing of other vehicles on multi-lane highways. The same condition may result from other driving situations such as when a signal is mistakenly given or when there is a change in purpose after a signal correctly given.

The foregoing objection has been recognized and various turn signal systems have been developed to cancel the signal after a predetermined period of time or a predetermined distance of travel following initial operation of the turn signal. In other turn signal systems, cancellation of a turn signal is dependent upon a predetermined depression of the vehicle accelerator or upon a predetermined decrease in the intake suction of the vehicle engine. Such systems have the obvious disadvantage that the signal may be canceled before the indicated turn is completed.

It is therefore an object of the present invention to provide an improved vehicle directional turn signal mechanism of the automatic reset type with auxiliary resetting means functioning to deenergize an indicated signal if not automatically deenergized when the vehicle is returned to a straight directional path.

Another object of the invention is to provide an improvement in turn signal mechanisms of the manually set, automatically reset type whereby in addition to having the usual resetting means operable in response to a predetermined degree of rotation of the steering mechanism in a direction opposite that of the indicated turn, they also include auxiliary resetting means functioning to automatically reset said turn signal mechanisms under conditions where the usual resetting means is ineffective to reset the mechanisms.

A further object of the invention is to provide an improve turn signal mechanism of the foregoing character which is compact in size, economical to manufacture and dependable in operation.

These and other objects are attained in accordance with the present invention by providing in a turn signal mechanism of the type reset by a predetermined degree of turning movement of the steering mechanism an auxiliary resetting means operable to reset the mechanism in response to a predetermined number of steering mechanism movements of less than said predetermined degree. The preferred embodiment of the invention includes a movable element actuated in response to a movement of the steering mechanism less than said predetermined degree. The movable element is coupled to a mechanism which counts the number of movements of the movable element while the operating mechanism is in a set or operated position. The counting mechanism is effectively connected to the turn signal mechanism to reset the latter after a predetermined number of actuations of the movable element. More specifically, the counting mechanism comprises ratchet wheels which are moved into ratcheting engagement with advancing pawls only in the set or operated position of the turn signal mechanism. Each ratchet wheel carries a cam member which is effective when the ratchet wheel has been rotated a predetermined amount to act upon the turn signal mechanism to effect resetting of the latter.

Other objects and features of the invention will be apparent from the following description and the accompanying drawings in which.

Figure 1:
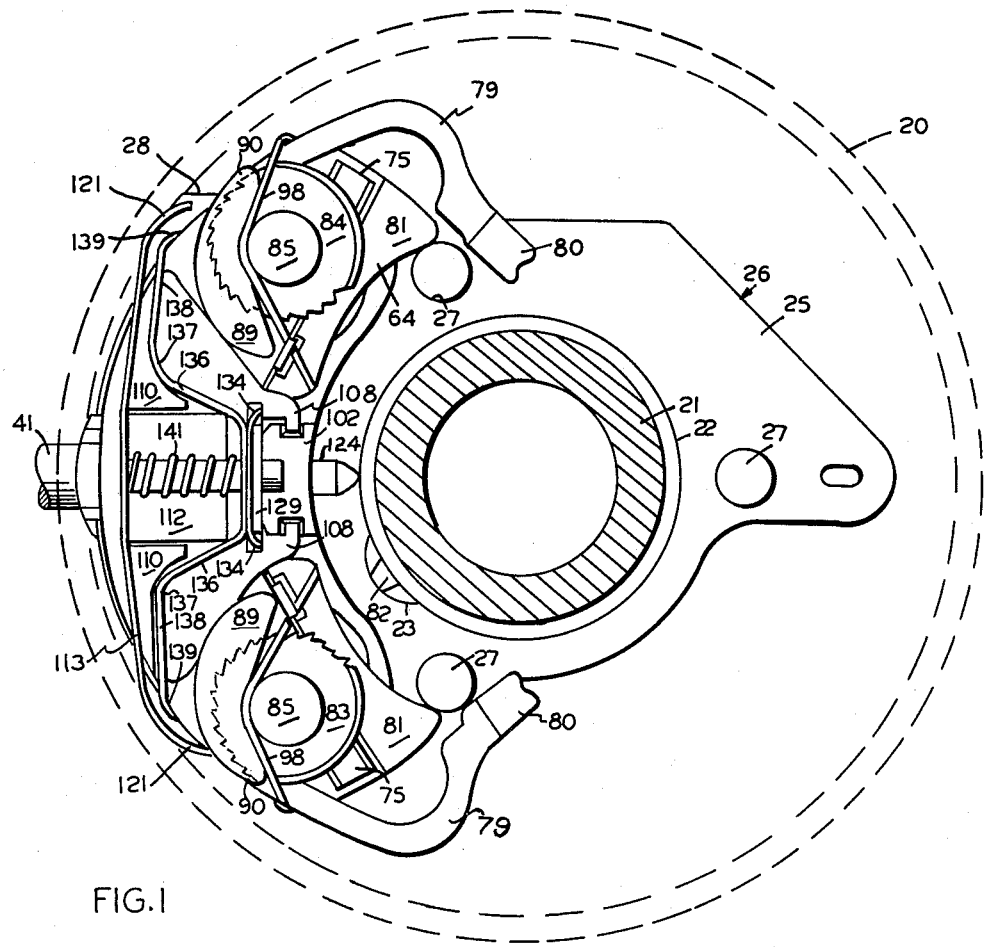
FIGURE 1 is a plan view partly in section illustrating the turn signal mechanism and its association with the steering mechanism, the turn signal mechanism being shown in its neutral position.
Figure 2:
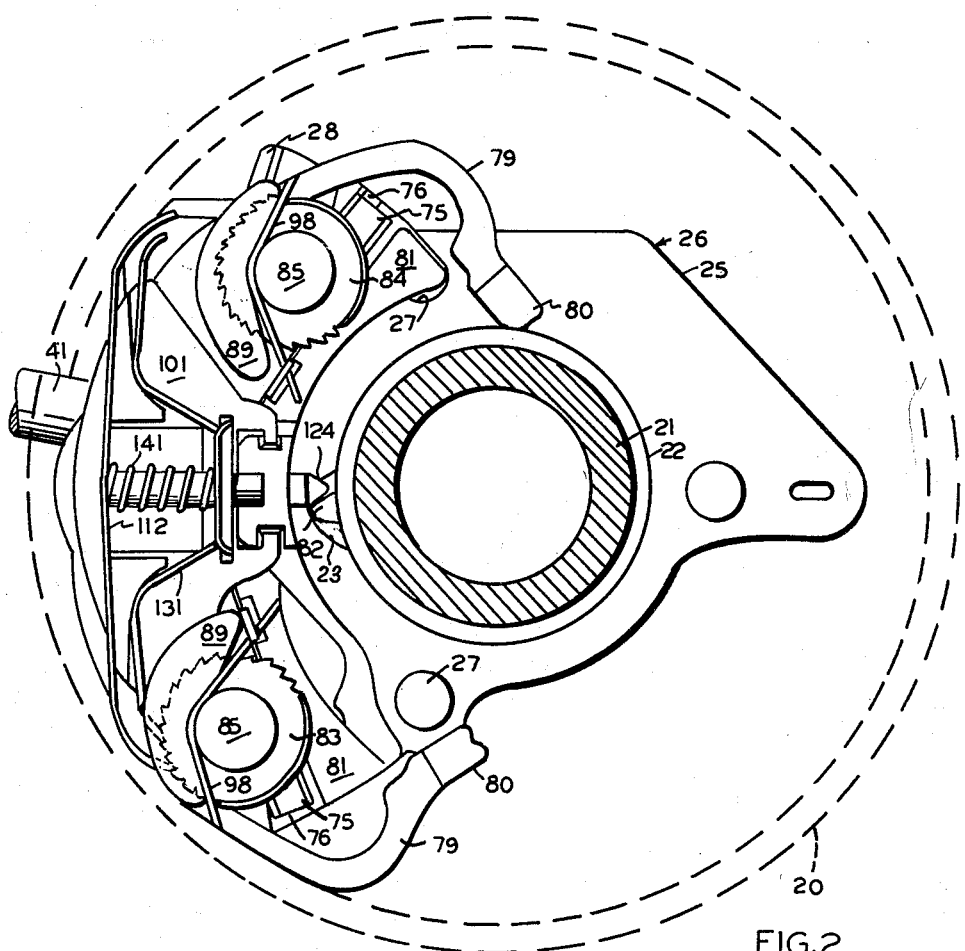
FIGURE 2 is a view similar to FIGURE 1 showing the mechanism in an operated position.

Referring now to the drawings and particularly FIGURES 1 and 2 thereon, the reference numeral 20 indicates the outline of a generally cylindrical housing which surrounds the steering shaft 21 of an automobile or like vehicle. A cenceling ring 22 is secured to the upper portion of the steering shaft 21 and has a radially extending canceling cam 23. The housing 20 is preferably supported upon the upper end of a steering column (not shown) within which the steering shaft 21 is rotatably mounted. The housing 20 may be disposed immediately beneath the hub of a steering wheel (not shown) attached to the steering shaft 21 and it will be apparent that canceling cam 23 may be connected directly with the hub of such a steering wheel.

A turn signal mechanism in which it is preferred to utilize the invention is shown supported within the housing 20 by the ring portion 25 of a molded base or support member 26. The ring portion 25 surrounds the steering shaft 21 and is provided with three holes 27 by which it may be fastened with screws to a lower end of the housing 20. The base member 26 also includes a switch case 28 which is made of electrical insulating material such as nylon and has a cavity 29 (FIGURE 7) containing switch parts. The case 28 includes a bottom wall 30, the sidewalls 31 and 32, and the end walls 33 and 34. The bottom wall 30 is provided at its inner side with a centrally located circular raised bearing boss 35 having a bore 36 therein for receiving the intermediate portion 37 of an operating shaft 38. The outer portion 39 of shaft 38 is of such diameter as to be unable to pass through the bore 36 in the case 28. The outer shaft portion 39 may be provided with a threaded opening 40 by which is attached an operating handle 41 for manual operation of the turn signal mechanism by the vehicle operator.

Two input contacts 42 and 43 project through the bottom wall 30 of the case 28 and are adapted to be connected to a vehicle battery 44 by, respectively, a flasher switch 45 and a brake-operated switch 46. Four output contacts 47, 48, 49 and 50 likewise project through the bottom wall 30 and are adapted to be connected, respectively, to the right front, right rear, left front and left rear signal lamps, 51, 52, 53 and 54. Such contacts may be of the type disclosed in the copending application of Howard A. Elliott, Serial No. 51,346, filed August 23, 1960, now Patent No. 3,041,577 issued June 26, 1962. In addition, two stems 55 and 56 generally similar in configuration to that of the contacts extend from the bottom wall 30 of the case 28. Two contact springs 57 and 58 of electrically conductive metal have their opposite ends formed with hooks 59 and 60 respectively. One hook 59 of the contact spring 57 embraces the contact 42 and the other hook 59 embraces the stem 55. Similarly, one hook 60 of the contact spring 58 embraces the contact 43 and the other hook 60 embraces the stem 56.

The contacts 47 and 48 with one hook 59 and one hook 60 are arranged to form one group of fixed contacts while the contacts 49 and 50 with the other hooks 59 and 60 form a second group of fixed contacts. Each such group of fixed contacts is adapted for engagement by a pair of generally U-shaped bridging contacts 61 and 62. A generally S-shaped spring 63 of conducive metal is compressed between the contacts 61 and 62 to provide electrical connection between the contacts 61 and 62 and to resiliently urge these contacts into electrical engagement with the fixed contacts.

Figure 4:
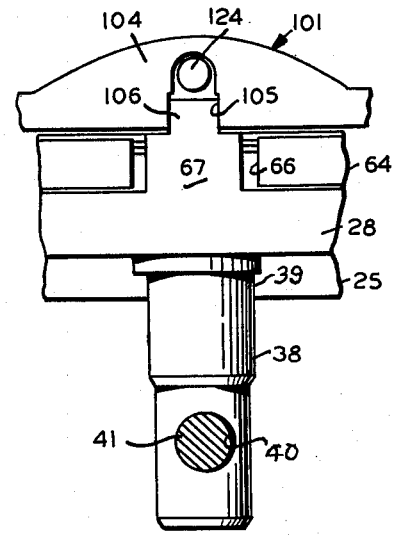
FIGURE 4 is a fragmentary elevational view of the turn signal mechanism as seen from the left hand side of FIGURE 1.
Figure 9:
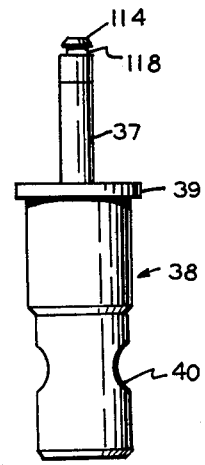
FIGURES 9 through 18 are plan views illustrating details of several components of the mechanism.
Figure 11:
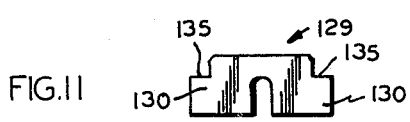
Figure 10:
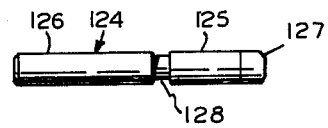
Figure 12:
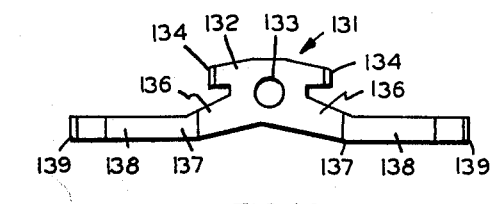
Figure 13:
Figure 7:
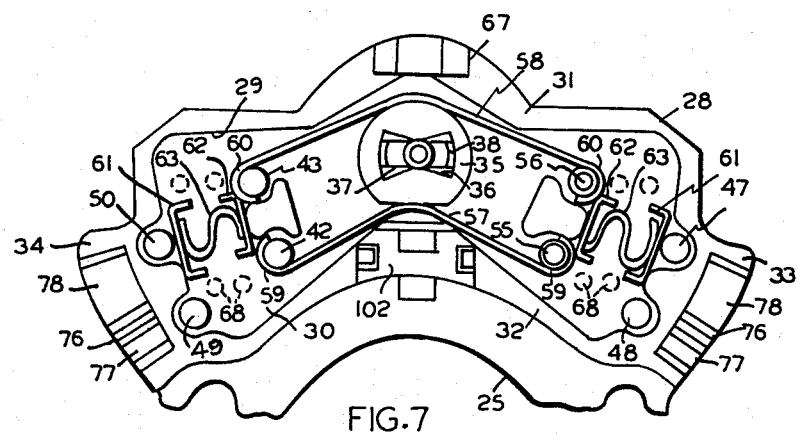
Figure 8:
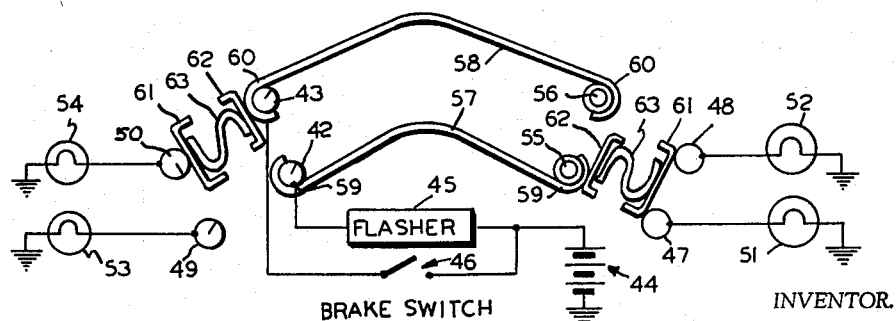
FIGURE 8 is a schematic wiring diagram of a turn signal system employing the turn signal mechanism.
Figure 15:
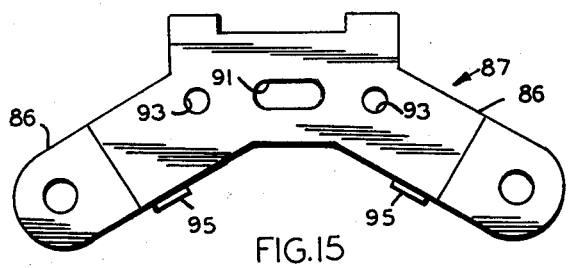
Figure 16:
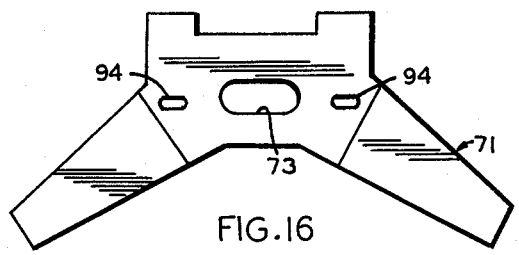
Figure 17:
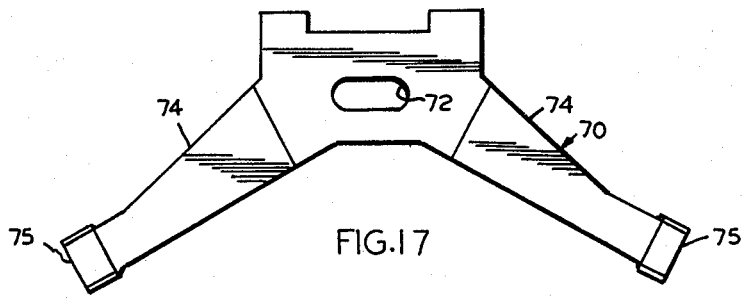
Figure 18:
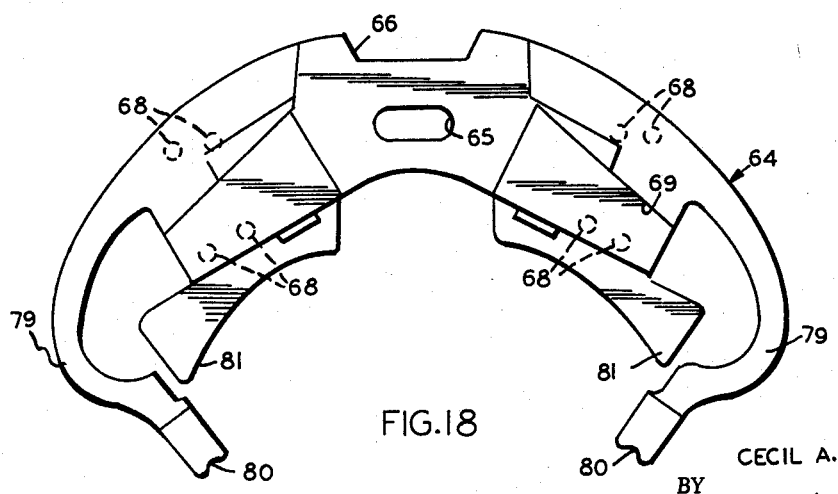

Fitting over the open face of the switch case 28 is a switch operating member in the form of a cover 64 of insulating material such as nylon having a central opening 65 in which the intermediate shaft portion 37 engages with a keyed connection to insure oscillation of the cover 64 with the operating shaft 38. The rotational movement of the cover 64 is limited by a slot 66 formed in an edge of the cover 64 and adapted to engage opposite sides of a raised portion 67 formed integrally with the top surface of the case side wall 31 (FIGURE 4). The inner surface of the cover 64 facing the switch case 28 is provided with two groups of projecting posts 68 (FIGURES 7 and 18). These posts 68 engage the bridging contacts 61 and 62 and serve to shift the latter when the cover 64 is moved by the operating shaft 38 from a central neutral position to either of two operating positions on opposite sides of the neutral position.

To yieldably maintain the cover 64 in its neutral position or either operating position, the outer surface of the cover 64 is recessed at 69 to receive a detent spring 70 and a backing spring 71. The intermediate portion 37 of the operating shaft 38 is non-rotatably received in similarly shaped openings 72 and 73, respectively, of the springs 70 and 71. The springs 70 and 71 are held against the cover 64 by the operating shaft 38 in a manner to be later described. The detent spring 70 has two arms 74 which are bent at their ends to form V-shaped lugs 75. The lugs 75 are biased into engagement with corresponding cam surfaces 76 (FIGURE 7) formed on the outer surface of the case end walls 33 and 34. Each cam surface 76 has a shallow narrow notch portion 77 and a wider, deeper notch portion 78, each having a flat bottom. In the neutral position of the cover 64, both lugs 75 resiliently engage the bottoms of the notch portions 78. When the cover 64 is shifted to either of its operating positions, one of the lugs 75 is raised into a corresponding one of the narrow notch portions 77 where it is resiliently held by the force of the springs 70 and 71.

To provide means for automatic resetting of the cover 64 from an operating position to the neutral position in response to a predetermined degree of rotation of the steering shaft 21, the cover 64 is provided with flexible curved extensions 79 having enlarged ends 80. Cooperating with each extension 79 and normally spaced therefrom is an abutment 81 integrally formed with the cover 64. When the cover 64 is shifted by the operating shaft 38 to signal a turn as shown in FIGURE 2, the end 80 of one flexible extension 79 is shifted into the path of movement of the canceling cam 23. As the steering shaft is turned clockwise to make the signaled turn, the canceling cam 23 will engage and displace the end 80. Upon reversal of rotation of the steering shaft 21 to return the vehicle to a straight ahead course, the canceling cam 23 will engage the end 80 from the opposite direction and force it against the adjacent abutment 81. Continued counterclockwise rotation of the steering shaft 21 then causes the cover 64 as a whole to return to its neutral position. Once the return movement of the cover 64 is commenced, the return movement is completed by the reaction of the detent spring 70 against the cam surface 76 as the lug 75 returns from the notch portion 77 to the notch portion 78. It will be obvious that the operation of the turn signal mechanism will be identical but in a reversed sense when the mechanism is operated to signal a turn in the opposite direction.

The structure which has been described above is conventional and is similar to that which has been employed for a number of years. This basic structure is not entirely satisfactory since a selected signal will not be canceled if only a slight rotation of the steering shaft 21 is required to make the signaled turn. If the degree of turning movement of the steering shaft 21 is such that the canceling cam 23 does not pass the ends 80 of the flexible extensions 79, the cover 64 will remain set in an operated position. This invention involves the addition of auxiliary resetting or return means which will return the turn signal mechanism to its neutral position upon completion of a predetermined number of oscillations of the steering shaft 21 which are less in degree than that necessary to effect canceling engagement of the canceling cam 23 with the ends 80 of the flexible extensions 79. For actuating such auxiliary resetting means, the canceling ring 22 is provided with an auxiliary canceling cam 82 which preferably is in alignment with the canceling cam 23.

Figure 6:
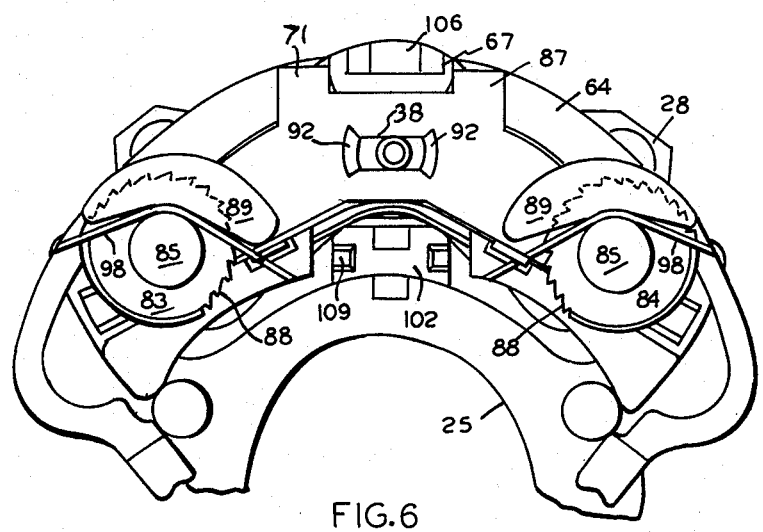

The auxiliary resetting means includes two ratchet wheels 83 and 84 rotatively mounted upon pins 85 which are secured to the arms 86 of a wheel support plate 87. The ratchet wheels 83, 84 each have the usual ratchet type teeth 88 (FIGURE 6) extending about approximately one half of its periphery. Also formed on each ratchet wheel is a cam member 89 having an outer cam surface 90 in varying distances from the axis of the ratchet wheel. The ratchet wheels 83 and 84 are reversely similar with respect to their axis of rotation and are each preferably one-piece moldings of nylon or other suitable plastic material.

Figure 3:
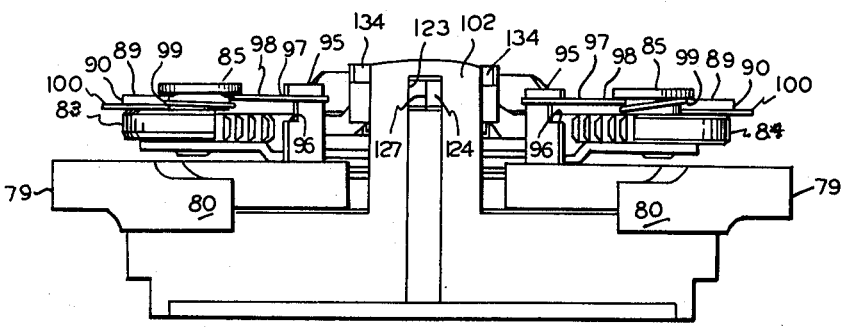
FIGURE 3 is an elevational view of the mechanism as seen from the right hand side of FIGURE 1.

The wheel support plate 87 overlies the backing spring 71 and is provided with a central opening 91 which non-rotatively receives the intermediate portion 37 of shaft 38. Portions 92 of the end of the intermediate shaft portion 37 are swedged over the wheel support plate 87 (FIGURE 6) to hold the support plate 87 as well as the detent spring 70 and the backing spring 71 in fixed relation with the cover 64. To further insure that the wheel support plate 87 will not shift relative to the cover 64, the support plate 87 may be provided with semi-perforated lugs 93 received in corresponding holes 94 formed in the backing spring 71. Each arm 86 of the support plate 87 has an upstanding flange 95 provided with a notch 96 (FIGURE 3). The notch 96 serves to anchor one end 97 of a torsion spring 98 having a central loop 99 which embraces a pin 85. The other end 100 of the spring 98 reacts against the side of the cam member 89 of a ratchet wheel to resiliently press the end of the cam member 89 against the side of the adjacent flange 95.

Figure 14:
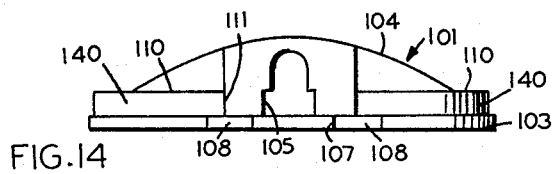

A shelf member 101 (FIG. 14) of nylon or other suitable plastic material is supported over the wheel support plate 87 by the raised portion 67 (FIG. 4) and an upright guide post 102 (FIG. 5) formed integrally with the side wall 32 of the switch case 28. The shelf member 101 comprises a base portion 103 having a raised wall 104 along one edge thereof with an opening 105 for receiving a locating projection 106 extending from the end surface of the raised portion 67. The base portion 103 also has a post receiving opening 107 defining a pair of lugs 108. These lugs 108 are received in generally rectangular grooves 109 formed in two sides of the outer end of the guide post 102.

Figure 5:
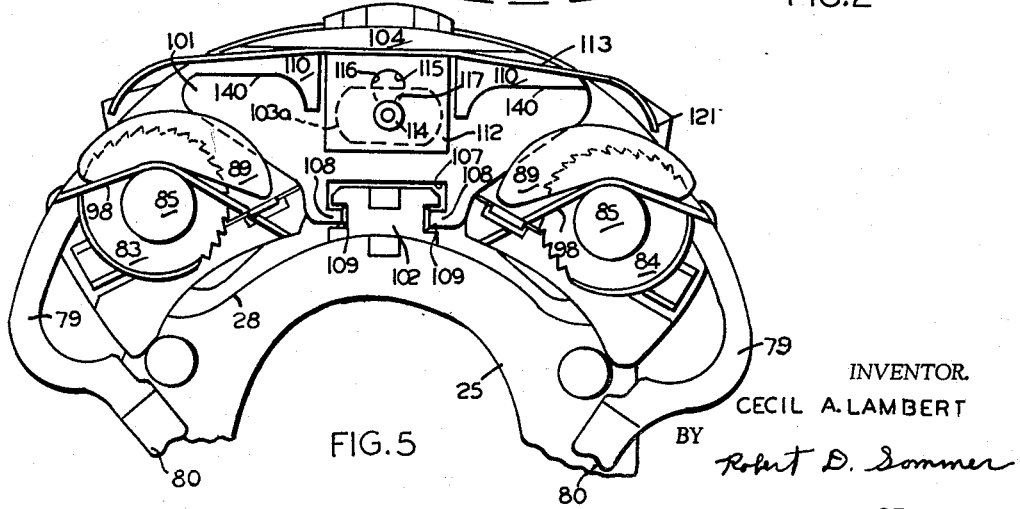
FIGURES 5, 6 and 7 are fragmentary plan views of the turn signal mechanism with certain components shown removed.

The shelf member 101 also has formed on its base portion 103 adjacent the wall 104 a pair of raised portions 110 providing a recess 111 therebetween. A transversely bowed bracket portion 112 of a spring member 113 sets in the recess 111 and is secured therein by the round end portion 114 of the operating shaft 38 which projects through opening 103a in the base portion 103 of the shelf member 101. As shown in FIGURE 5, the bracket portion 112 is provided with a key hole slot 115 having a circular portion 116 of sufficiently large diameter that will permit the shaft end portion 114 to pass through it. Extending from the circular portion 116 is a narrow portion 117 of a width to receive a grooved or reduced diameter portion 118 of the shaft end portion 114. The bracket portion 112 is slipped over the shaft end portion 114 and is slid until the narrow portion 117 of the slot 115 rests in the grooved portion 118. The bowed bracket portion 112 must be flattened somewhat to slide it over the shaft end portion 114 and is held with a tight resilient pressure which prevents its becoming accidentally disengaged from the shelf member 101. The spring member 113 which is formed from flat spring metal is provided with a neck portion 119 generally perpendicular to the bracket portion 112. Two arms 120 which extend laterally from the neck portion 119 each have a bent end portion forming a holding pawl 121 adapted for holding engagement with its respective ratchet wheel 83, 84. A circular bearing hole 122 is pierced through the neck portion 119 in alignment with a rectangular bearing aperture 123 formed in the guide post 102 for guiding a reciprocating element or plunger 124 with a rectilinear motion. The plunger 124 comprises a rectangular portion 125 which slides in the bearing aperture 123 of the guide post 102 and a round portion 126 which slides in the bearing hole 122 of the spring member 113. The rectangular portion 125 has a wedge-shaped end 127 which projects in the path of movement of the canceling cam 82. The plunger is also provided with an intermediate portion 128 of reduced diameter.

A slotted key 129 straddles the plunger 124 with its legs 130 disposed in the intermediate portion 128 of the plunger 124 so as to limit outward movement of the plunger end 127. A ratchet pawl spring 131 of sheet metal has an intermediate portion 132 with a circular opening 133 so that it may be placed over the plunger portion 126 and bear against the key 129 with two bent lugs 134 fitting over the shoulders 135 formed on the upper edge of the key 129. The ratchet pawl spring 131 also has a pair of wings each comprising a deflecting portion 136 connected by a bend 137 to a laterally offset portion 138 which has a bent end portion forming a ratchet pawl 139 adapted for ratcheting engagement with its respective ratchet wheel 83, 84. The bends 137 are biased against the curved side faces 140 of the raised portions 110 on the shelf member 101. A coiled compression spring 141 is disposed about the plunger portion 126 between the spring member 112 and the ratchet pawl spring 131 thereby exerting a continuous spring pressure to hold the key 129 and the ratchet pawl spring 131 in secure connection. The key 129 is inserted in latching engagement with the plunger 124 and the ratchet pawl spring after the latter parts together with the coiled spring 141 are assembled in place.

Normally, the plunger 124 is held in the biased position shown in FIGURE 1 by abutment of the key 129 against the guide post 102 and it will be apparent that each time the canceling cam 82 passes the outer end 127 of the plunger 124, the plunger will be urged inwardly or to the left as viewed in FIGURE 1. Since the plunger end 127 is positioned near the straight ahead position of the steering shaft 21, steering shaft movements of relatively small degree in either direction will actuate the plunger 124. As the plunger 124 moves to the left, it further presses the wings of the ratchet pawl spring 131 against the side faces 140 of the shelf member 101, causing the deflecting portions 136 to bend away from each other. This bending of the deflecting portions 136 causes the offset portions 138 to slide along the side faces 140 so as to direct the ratchet pawls 139 toward the ratchet teeth 88 of the ratchet wheels 83 and 84. In the neutral position of the turn signal mechanism as shown in FIGURE 1, the extent that the ratchet pawls 139 must travel to engage the ratchet wheels 83 and 84 is so great the pawls 139 remain clear of the ratchet wheels. It is to be noted that the holding pawls 121 are also clear of the ratchet wheels in the neutral position of the turn signal mechanism.

When the turn signal mechanism is actuated to indicate a right-hand turn as shown in FIGURE 2, the cover 64 together with the ratchet wheels is moved to a position where the one ratchet pawl 139 and the one holding pawl 121 engage the ratchet wheel 83. The engagement of the pawls with the ratchet wheel interferes in no way with the normal canceling or return action of the mechanism effected by engagement of the canceling cam 23 with the ends of the flexible extensions 79. However, in the event the movement of the canceling cam 23 is of insufficient degree to reset the mechanism to its neutral position, the minor rotations of the steering shaft 21 occurring as the operator of the vehicle maintains a straight ahead course causes the canceling cam 82 to repeatedly rotate past the plunger end 127 with resulting actuations of the plunger 124. Each such actuation of the plunger 124 causes the one ratchet pawl 139 to rotate the ratchet wheel 83 a predetermined amount in a counterclockwise direction. The one holding pawl 121 acts as a stop to prevent reverse or clockwise rotation of the ratchet wheel by the torsion spring 98 as long as the cover 64 remains in its operated position. This counterclockwise movement of the ratchet wheel 83 advances the cam member 89 carried by it toward the housing 20, and after a succession of plunger actuations, the cam member 89 is forced against the housing 20. Upon further movement of the ratchet wheel 83 in the counterclockwise direction, the force of the cam member 89 against the housing 20 is sufficiently great to overcome the retaining force of the detent spring 70 against the narrow notch portion 77 of the cam surface 76 to shift the cover 64 back toward its neutral position. As the cover 64 returns to its neutral position, the pawls 121 and 139 are disengaged from the ratchet wheel 83 and the latter will be returned to its normal position by the action of the torsion spring 98. When the turn signal mechanism is set for indicating a left-hand turn, the operation of the auxiliary resetting means is the same as that set forth above except that the other ratchet wheel 84 and its associated pawls 121 and 139 are involved.

Thus the auxiliary resetting or return means counts the number of minor turning movements of the steering shaft 21 while the turn signal mechanism is in either of its operating positions and automatically returns the turn signal mechanism to a neutral position after a predetermined number of such turning movements of the steering shaft. The number of steering shaft movements required for the auxiliary resetting means to return the cover 64 to its neutral position is dependent upon the shape of the cam members 89 and the spacing of the ratchet teeth 83 of the ratchet wheels. It is preferred that the resetting of the turn signal mechanism occur with seven to twelve steering shaft movements.

From the foregoing, it will be observed that the present invention provides novel auxiliary resetting means for an automotive turn signal mechanism embodying novel features of construction and operation. The simplicity of its construction requires only minor modifications in the design of prior turn signal mechanisms in which it is incorporated and results in an extremely compact arrangement which is easily manufactured. It is important to note that the auxiliary resetting means of this invention provides the desired auxiliary canceling action yet interferes in no way with the normal canceling action of the turn signal mechanism.

It will be evident that the auxiliary resetting means of this invention may be readily adapted to forms of turn signal mechanisms other than the specific one illustrated and described. It will also be obvious that the auxiliary resetting means may be so constructed that the cam members 89 act against a stationary member other than the housing of the turn signal mechanism. It will be apparent that these and other changes and modifications may be made to the one embodiment of the invention shown and described herein without departing from the scope of the invention as defined in the claims.

What is claimed is:

1. In a turn signal mechanism of the type associated with the steering mechanism of a vehicle and including a switch operating member manually operated from a neutral position to operating positions at opposite sides of said neutral position and automatically returned to said neutral position in response to a movement of said steering mechanism greater than a predetermined degree, the combination with said operating member of:

(a) a pair of ratchet wheels rotatably mounted on said switch operating member;
(b) spring means biasing each of said ratchet wheels to a normal position;
(c) a reciprocating element movable in response to a movement of said steering mechanism less than said predetermined degree;
(d) advancing pawl means operable by said reciprocating element and adapted to have ratchet engagement with one or the other of said ratchet wheels only when said switch operating member is in, respectively, one or the other of its operating positions, said advancing pawl means being arranged to rotate said ratchet wheels against the force of said spring means in response to movement of said reciprocating element;
(e) holding pawl means adapted to have holding engagement with one or the other of said ratchet wheels only when said switch operating member is in, respectively, one or the other of its operating positions, said holding pawl means serving to prevent rotation of said ratchet wheels in a direction reverse to that occasioned by engagement of said advancing pawl means with said ratchet wheels;
(f) a cam member secured to each of said ratchet wheels and rotating therewith;
(g) stationary means positioned to be in the path of one or the other of said cam members when said switch operating member is in, respectively, one or the other of its operating positions, said stationary means being arranged for selective engagement by one of said cam members after a predetermined rotation of its respective ratchet wheel in response to a predetermined number of successive actuations thereof by said advancing pawl means; and
(h) said cam members being so arranged in relation to said switch operating member and said stationary means that engagement of said cam members with said stationary means is effective to return said switch operating member from an operating position to said neutral position.

2. In a turn signal mechanism adapted for use with a vehicle steering mechanism including rotatable cam means enclosed by a housing, said turn signal mechanism comprising a support member, means for mounting said support member within said housing on said steering mechanism, adjacent said cam means, a switch operating member mounted on said support member for movements from a neutral position to switch operating positions at opposite sides of said neutral position, means carried by said operating member for yieldably maintaining said operating member in any selected one of said positions, means connected to said operating member for moving the latter from said neutral position to either of said operating positions, and return means mounted on said operating member operable to return the latter to said neutral position from either of said operating positions in response to a predetermined degree of rotation of said cam means in a predetermined degree; the improvement in said turn signal mechanism comprising auxiliary return means operable to return said operating member to said neutral position in response to a predetermined number of rotations of said cam means less than said predetermined degree, said return means comprising in combination:

(a) a pair of ratchet wheels rotatably mounted on said operating member;
(b) a cam member secured to each of said ratchet wheels and rotating therewith;
(c) stop means on said operating member for preventing rotary movement of said cams in one direction beyond a normal position thereof;
(d) spring means for yieldably urging said cam members against said stop means;
(e) guide means carried by said support member;
(f) a plunger guided between said ratchet wheels by said guide means for rectilinear reciprocating movement;
(g) a coiled spring encircling said plunger and yieldably urging an end portion of said plunger into the path of said rotatable cam means;
(h) a ratchet pawl spring having two advancing pawl ends and an intermediate portion mounted upon said plunger between said end portion thereof and said coiled spring;
(i) said plunger being adapted to move said ratchet pawl spring in opposition to said coiled spring in response to a rotation of said rotatable cam means less than said predetermined degree;
(j) one pawl end of said ratchet pawl spring being arranged to have ratcheting engagement with one of said ratchet wheels only when said switch operating member is in one of its operating positions, said one pawl end being arranged to rotate said one ratchet wheel against the force of said spring means a predetermined distance in response to each movement of said plunger by said rotating cam means;
(k) the other pawl end of said ratchet pawl spring being arranged to have ratcheting engagement with the other of said ratchet wheels only when said switch operating member is in the other of its operating positions, said other pawl end being arranged to rotate said other ratchet wheel against the force of said spring means a predetermined distance in response to each movement of said plunger by said rotating cam means;
(l) holding pawl means carried by said supporting member and adapted to have holding engagement with said one or said other ratchet wheel only when said switch operating member is in, respectively, said one or said other operating position, said holding pawl means serving to prevent rotation of each ratchet wheel in a direction reverse to that occasioned by engagement of said ratchet pawl spring with the respective ratchet wheels;

(m) one of said cam members having a cam surface adapted to engage said housing to return said operating member to its neutral position in response to a predetermined rotation of said one ratchet wheel when said switch operating member is in said one operating position; and (n) the other of said cam members having a cam surface adapted to engage said housing to return said operating member to its neutral position in response to a predetermined rotation of said other ratchet wheel when said switch operating member is in said other operating position.

3. In a turn signal mechanism for a vehicle of the type including rotatable cam means carried by the vehicle steering shaft, a base member mounted adjacent said cam means, a switch mounted on said base member, a switch operating member mounted on said base member for manual movement from a neutral position to switch operating positions at opposite sides of said neutral position, and resetting means on said switch operating member movable into the path of said cam means in response to movement of said switch operating member to a switch operating position and engageable by said cam means to return said switch operating member to its neutral position only in response to a movement of said cam means greater than a predetermined degree; the combination with said cam means, said base member and said switch operating member of auxiliary resetting means operable to return said switch operating member from either of said switch operating positions to said neutral position in response to a predetermined number of oscillations of said cam means of a degree less than said predetermined degree, said auxiliary resetting means comprising:

(a) a reciprocating element mounted on said base member for reciprocating movement between two positions;

(b) resilient means yieldably urging said reciprocating element to one of said positions;

(c) said reciprocating element in said one position having one end lying in the path of said cam means and engageable by said cam means to cause displacement of said reciprocating element from said one position to the other of its said positions in response to a movement of said camming means less than said predetermined degree;

(d) movable cam elements mounted on said switch operating member and having ratcheting means connected thereto for moving said cam elements into engagement with fixed parts of said turn signal mechanism, said cam elements being so arranged on said switch operating member that abutting engagement of said cam elements with said fixed parts in response to predetermined movement of said cam elements effects a return of said switch operating member from its operating positions to its neutral position; and (e) pawl means movable by said reciprocating element into driving engagement with said ratchet means to impart a step-by-step movement to said ratchet means effecting movement of said cam elements through an increment of said predetermined movement in response to one reciprocation of said reciprocating member whereby said predetermined movement of said cam elements is effected by a predetermined number of successive reciprocations of said reciprocating member.

4. In a turn signal mechanism for a vehicle of the type including rotatable cam means carried by the vehicle steering shaft, a base member mounted adjacent said cam means, a switch mounted on said base member, a switch operating member mounted on said base member for manual movement from a neutral position to switch operating positions at opposite sides of said neutral position, and resetting means on said switch operating member movable into the path of said cam means in response to movement of said switch operating member to a switch operating position and engageable by said cam means to return said switch operating member to its neutral position only in response to a movement of said cam means greater than a predetermined degree; the combination with said cam means, said base member and said switch operating member of auxiliary resetting means operable to return said switch operating member from either of said switch operating positions to said neutral position in response to a predetermined number of oscillations of said cam means of a degree less than said predetermined degree, said auxiliary resetting means comprising:

(a) a reciprocating element mounted on said base member for reciprocating movement between two positions;

(b) resilient means yieldably urging said reciprocating element to one of said positions;

(c) said reciprocating element in said one position having one end lying in the path of said cam means and engageable by said cam means to cause displacement of said reciprocating element from said one position to the other of its said positions in response to a movement of said camming means less than said predetermined degree;

(d) movable cam elements mounted on said switch operating member and having ratcheting means connected thereto for moving said cam elements from a normal position thereof into engagement with fixed parts of said turn signal mechanism, said cam elements being so arranged on said switch operating member that abutting engagement of said cam elements with said fixed parts in response to predetermined movement of said cam elements effects a return of said switch operating member from its operating positions to its neutral position;

(e) advancing pawl means movable by said reciprocating element into driving engagement with said ratchet means to impart a step-by-step movement to said ratchet means effecting movement of said cam means from said normal position thereof through an increment of said predetermined movement in response to one reciprocation of said reciprocating member whereby said predetermined movement of said cam elements is effected by a predetermined number of successive reciprocations of said reciprocating member;

(f) spring means biasing said cam elements into said normal position thereof; and (g) holding pawl means mounted on said base member and positioned thereon to have holding engagement with said ratcheting means when said switch operating member is in its operating positions to prevent return of said cam elements to said normal position thereof while said switch operating member is in its operating positions.

5. In a turn signal mechanism for a vehicle of the type including rotatable cam means carried by the vehicle steering shaft, a base member mounted adjacent said cam means, a switch mounted on said base member, a switch operating member mounted on said base member for manual movement from a neutral position to switch operating positions at opposite sides of said neutral position, and resetting means on said switch operating member movable into the path of said cam means in response to movement of said switch operating member to a switch operating position and engageable by said cam means to return said switch operating member to its neutral position only in response to a movement of said cam means greater than a predetermined degree; the combination with said cam means, said base member and said switch operating member of auxiliary resetting means operable to return said switch operating member from either of said switch operating positions to said neutral position in response to a predetermined number of oscillations of said cam means of a degree less than said predetermined degree, said auxiliary resetting means comprising:

(a) a reciprocating element mounted on said base member for reciprocating movement between two positions;

(b) resilient means yieldably urging said reciprocating element to one of said positions;

(c) said reciprocating element in said one position having one end lying in the path of said cam means and engageable by said cam means to cause displacement of said reciprocating element from said one position to the other of its said positions in response to a movement of said camming means less than said predetermined degree;

(d) a pair of movable cam members each mounted on said switch operating member and having a ratchet mechanism connected thereto for moving its respective cam means positioned in the path of one or the other of said cam members when said switch operating member is in, respectively, one or the other of its operating positions;

(e) stationary means positioned in the path of one or the other of said cam members when said switch operating member is in, respectively, one or the other of its operating positions;

(f) each of said cam members having a cam surface movable into engagement with said stationary means, each of said cam members being so arranged on said switch operating member that abutting engagement of its respective cam surface with said stationary means in response to predetermined movement of said cam member from its normal position effects a return of said switch operating member from its respective operating position to its neutral position;

(g) advancing pawl means movable by said reciprocating element into driving engagement with said ratchet mechanism of one or the other of said cam members when said switch operating member is in, respectively, one or the other of its operating positions, said advancing pawl means being operative to impart a step-by-step movement to said ratchet mechanism effecting a movement of the respective cam member through an increment of said predetermined movement upon one reciprocating of said reciprocating member whereby said predetermined movement of a cam member is effected by a predetermined number of successive reciprocations of said reciprocating member;

(h) spring means biasing each of said cam members into its respective normal position; and (i) holding pawl means mounted on said base member and positioned thereon to have holding engagement with said ratchet mechanism of one or the other of said cam members when said switch operating member is in, respectively, one or the other of its operating positions to prevent return of the respective cam member to said normal position thereof while said switch operating member is in its respective operating position.

6. In a turn signal mechanism for a vehicle of the type including rotatable cam means carried by the vehicle steering shaft, a base member mounted adjacent said cam means, a switch mounted on said base member for manual movement from a neutral position to first and second switch operating positions at opposite sides of said neutral position, and resetting means on said switch operating member movable into the path of said cam means in response to movement of said switch operating member to a switch operating position and engageable by said cam means to return said switch operating member to its neutral position only in response to a movement of said cam means greater than a predetermined degree; the combination with said cam means, said base member and said switch operating member of auxiliary resetting means operable to return said switch operating member from either of said switch operating positions to said neutral position in response to a predetermined number of oscillations of said cam means of a degree less than said predetermined degree, said auxiliary resetting means comprising:

(a) a reciprocating element mounted on said base member for reciprocating movement between two positions;

(b) resilient means yieldably urging said reciprocating element to one of said positions;

(c) said reciprocating element in said one position having one end lying in the path of said cam means and engageable by said cam means to cause displacement of said reciprocating element from said one position to the other of its said positions in response to a movement of said camming means less than said predetermined degree;

(d) a first cam member mounted on said switch operating member and movable from a normal position into engagement with a fixed part of said turn signal mechanism, said first cam member being so arranged on said switch operating member that abutting engagement of said cam element with said fixed part in response to a predetermined movement of said first cam member effects a return of said switch operating member from said first operating position to its neutral position;

(e) a second cam member mounted on said switch operating member and movable from a normal position into engagement with a fixed part of said turn signal mechanism, said second cam member being so arranged on said switch operating member that abutting engagement of said cam element with said fixed part in response to a predetermined movement of said second cam member effects a return of said switch operating member from said second operating position to its neutral position;

(f) spring means biasing each of said cam members to its respective normal position;

(g) a first ratchet mechanism connected to said first cam member for moving said first cam member from its said normal position into engagement with said fixed part;

(h) a second ratchet mechanism connected to said second cam member for moving said second cam member from its said normal position into engagement with said fixed part;

(i) a first advancing pawl movable by said reciprocating element into driving engagement with said first ratchet mechanism when said switch operating member is in said first switch operating position, said first advancing pawl being operative to impart a step-by-step movement to said first ratchet mechanism against the force of said spring means effecting a movement of said first cam member through an increment of said predetermined movement upon one reciprocation of said reciprocating member;

(j) a second advancing pawl movable by said reciprocating element into driving engagement with said second ratchet mechanism when said switch operating member is in said second switch operating position, said second advancing pawl being operative to impart a step-by-step movement to said second ratchet mechanism against the force of said spring means effecting a movement of said second cam member through an increment of said predetermined movement upon one reciprocation of said reciprocating member;

(k) a first holding pawl mounted on said base member and positioned thereon to have holding engagement with said first ratchet member when said switch operating member is in said first switch operating position to prevent return of said first cam member to said normal position thereof by said spring means; and (l) a second holding pawl mounted on said base member and positioned thereon to have holding engagement with said second ratchet member when said switch operating member is in said second switch operating position to prevent return of said second cam member to said normal position thereof by said spring means.

References Cited by the Examiner
UNITED STATES PATENTS

| | | | |
|---|---|---|---|
| 1,928,315 | 9/33 | Martin et al. | 200—61.32 |
| 2,725,435 | 11/55 | Cislo | 200—61.34 |
| 3,020,774 | 2/62 | Kullman | 74—142 |

BERNARD A. GILHEANY, *Primary Examiner.*
ROBERT K. SCHAEFER, *Examiner.*